(12) United States Patent
Sarwat et al.

(10) Patent No.: US 11,936,206 B1
(45) Date of Patent: Mar. 19, 2024

(54) SYSTEMS AND METHODS FOR COMBINED INDUCTIVE POWER TRANSFER AND CAPACITIVE POWER TRANSFER

(71) Applicants: Arif I. Sarwat, Miami, FL (US); Milad Behnamfar, Miami, FL (US)

(72) Inventors: Arif I. Sarwat, Miami, FL (US); Milad Behnamfar, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/477,677

(22) Filed: Sep. 29, 2023

(51) Int. Cl.
*H02J 50/40* (2016.01)
*B60L 53/12* (2019.01)
*B60L 53/30* (2019.01)
*H02J 50/05* (2016.01)
*H02J 50/10* (2016.01)

(52) U.S. Cl.
CPC ............ *H02J 50/40* (2016.02); *B60L 53/12* (2019.02); *B60L 53/32* (2019.02); *H02J 50/05* (2016.02); *H02J 50/10* (2016.02)

(58) Field of Classification Search
CPC .. H02J 50/40; H02J 50/05; H02J 50/10; H02J 50/12; B60L 53/12; B60L 53/32; B60L 5/005
See application file for complete search history.

(56) References Cited

U.S. PATENT DOCUMENTS

| | | | | |
|---|---|---|---|---|
| 2018/0301932 A1* | 10/2018 | Mansell | ................. | B60L 53/57 |
| 2019/0207420 A1* | 7/2019 | Afridi | ................. | H04B 5/0012 |
| 2021/0013743 A1* | 1/2021 | Hu | ......................... | H02J 50/12 |
| 2021/0066961 A1* | 3/2021 | Mi | .......................... | H02J 50/05 |
| 2022/0255348 A1* | 8/2022 | Afridi | .................... | B60L 53/10 |

FOREIGN PATENT DOCUMENTS

GB 2510125 A * 7/2014 ............. B60L 1/003

* cited by examiner

*Primary Examiner* — David V Henze-Gongola
(74) *Attorney, Agent, or Firm* — Saliwanchik, Lloyd & Eisenschenk (57) ABSTRACT

Systems and methods are provided for combined inductive power transfer (IPT) and capacitive power transfer (CPT) to reduce power pulsation in dynamic charging of electric vehicles. Aluminum plates provided between transmitter coils inhibit output power drop, the power pulsation can be reduced, and a constant power profile is provided by operation of CPT system when the receiver is between the IPT coils. As the aluminum plates cover the space between coils, the IPT coils can be separated away from each other by a longer distance compared to conventional segmented coils; therefore, a lesser copper can be used which enhances the cost effectiveness of the provided system. As the respective IPT and CPT system are used alternatively, thus the system's output power can be constant, nearly constant, or effectively constant.

18 Claims, 10 Drawing Sheets

SYSTEMS AND METHODS FOR COMBINED INDUCTIVE POWER TRANSFER AND CAPACITIVE POWER TRANSFER

BACKGROUND

Wireless power transfer is a practical alternative to plug-in charging of electric vehicles that eliminates certain drawbacks of plug-in charging. Inductive power transfer and capacitive power transfer are two effective methods of charging electric vehicles. The research in wireless charging of electric vehicles is mainly divided in two main sections: stationary charging and dynamic charging. Dynamic charging of an electric vehicle is a promising technology that enables electric vehicles to be charged in motion which address the electric vehicle range limitation and battery size requirements. In the dynamic charging of electric vehicles, there are two types of transmitter's coil: long track transmitter and segmented coil array. Long track transmitters coil due to lower efficiency and high electromagnetic interference (EMI) is not preferred for commercial applications. Segmented coil array is the currently preferred option for dynamic charging as it solves certain drawbacks of long track transmitter systems. However, segmented coil array has one major drawback, and it is power pulsation. As the receiver moves along the transmitter, the receiver coil being connected to the multiple coils will produce pulsing at the receiver side, which can be detrimental or harmful for battery lifetime, and can also adversely affect the efficiency.

Researchers to reduce the power pulsation at the battery side, are focused on the coil design or control system. For coil design, different coil structures such as using crossed DD coil, DDQ coil, quadrature-coils, multi-phase transmitter system, and multi-phase receiver, often adding one or more additional coils. Drawbacks of these related art designs increased cost (e.g., from additional copper material and manufacturing cost), increased complexity, and increased power loss which affects the overall efficiency of the system. Control section is another area which researchers have attempted to reduce the power pulsation, such as primary side control, secondary side control, and dual side control. One disadvantage of controller based solutions is that in the real world as different electric vehicles are charged at the same time, a communication between electric vehicles and a supply side control center is required which has disadvantages of increased cost, technical complexity, and opportunities for failure.

BRIEF SUMMARY

Embodiments of the subject invention provide novel and advantageous combined inductive power transfer (IPT) and capacitive power transfer (CPT) for dynamic charging, in which an IPT system and a CPT system can be designed in such a way that their power profiles are the inverse of each other to achieve a smooth output profile. In other words, the CPT system power is at its maximum value when the IPT system power is at its minimum value. In certain embodiments, the output power is provided as the summation of IPT system power and CPT system power, and advantageously the fluctuation of the output power is reduced significantly.

Figure 1:
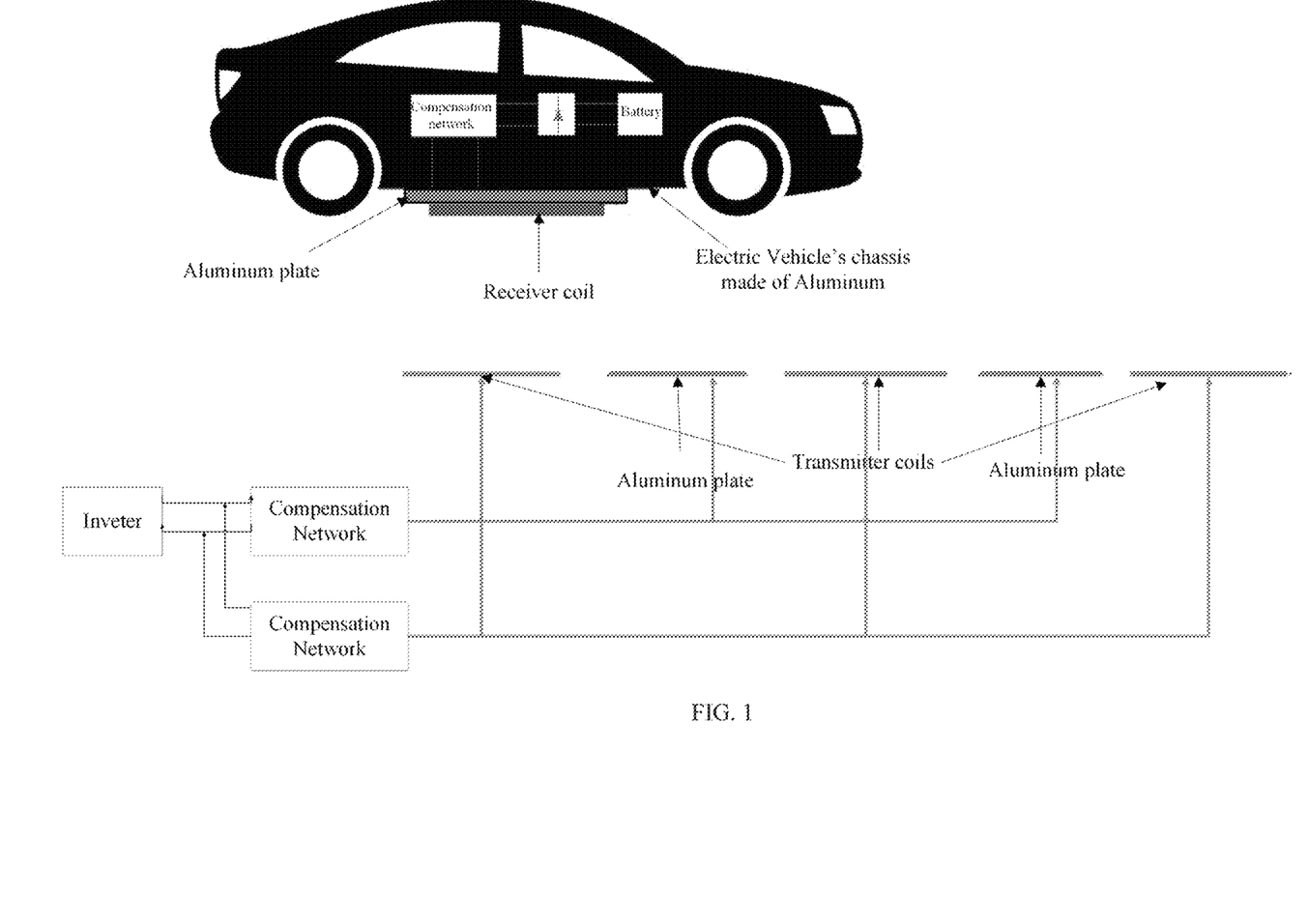
FIG. 1 schematically represents the structure of the combined IPT and CPT system according to an embodiment of the subject invention. Three IPT transmitter coils are installed underground and aluminum plates are placed between the coils to form the capacitive couplers.

System structure according to one exemplary embodiment (e.g., as shown in FIG. 1) provides a number of IPT coils (e.g., three inductive coils) installed on the ground as the inductive transmitters and a number of CPT capacitive couplers (e.g., two aluminum plates) placed between the coils as the capacitive couplers.

Figure 2:
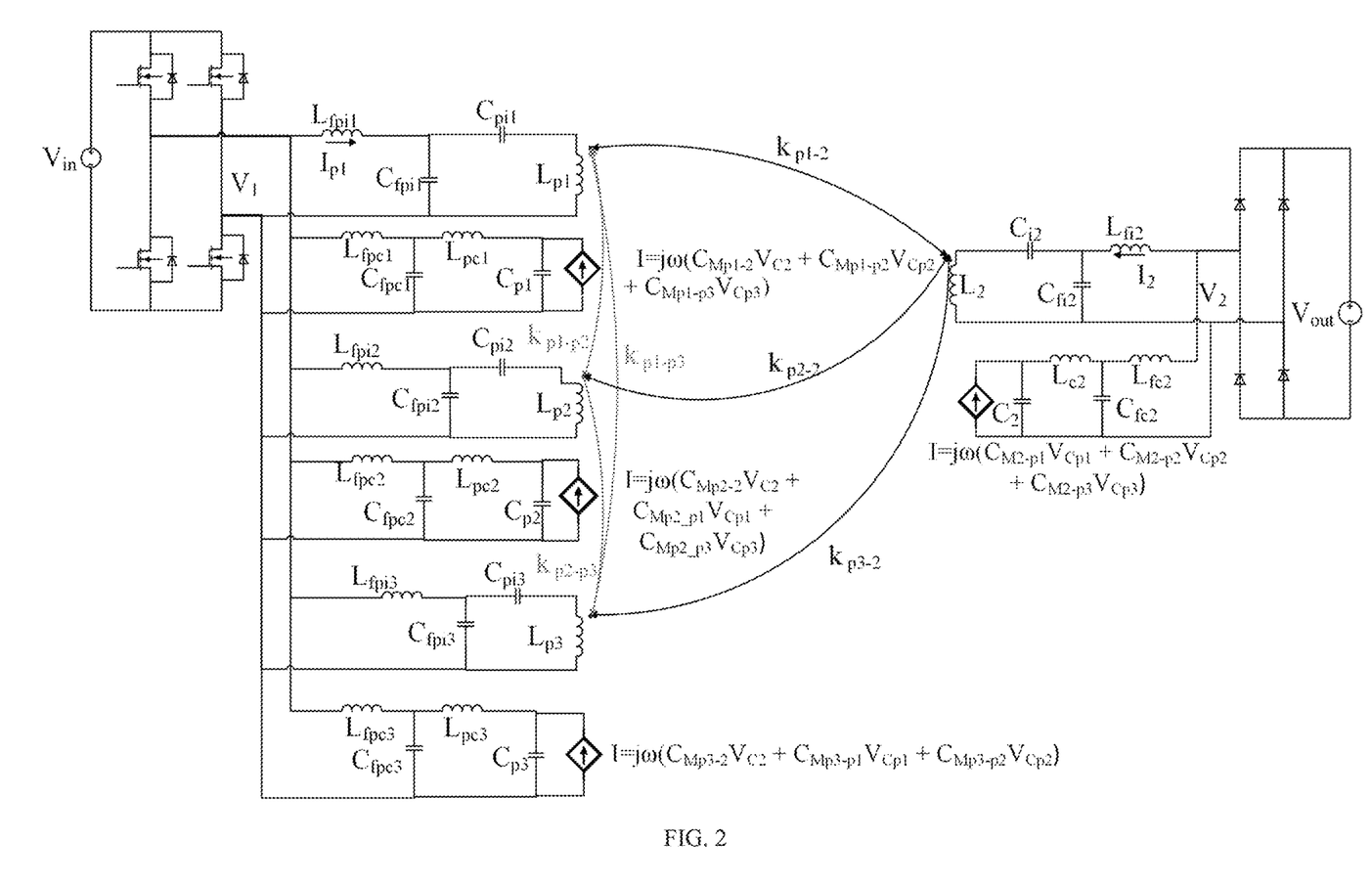
FIG. 2 shows the circuit topology of the combined IPT and CPT system according to an embodiment of the subject invention. In the depicted embodiment the compensation network of the IPT system is LCC-compensation network and the compensation network for CPT system is LCLC-compensation network.

According to another exemplary embodiment (e.g., as shown in FIG. 2), a circuit topology of the combined IPT and CPT system is provided. In this embodiment a compensation network for the IPT system is an LCC-compensation network and the compensation network for CPT system is an LCLC-compensation network.

Certain embodiments provide, have been tested by, and have been developed from simulation of the inductive and capacitive coupler showing that the inductive and capacitive coupling between adjacent coils and plates is very small and thus can be neglected. Fundamental harmonic approximation can be used to calculate the output power of the systems of embodiments of the subject invention using Equation (1).

$$P_{out} = P_{IPT} + P_{CPT} = \frac{\sum_{k=1}^{3} M_{pk,2}}{\omega L_{fpi} L_{f2}} |V_1||V_2| + \frac{\omega \sum_{j=1}^{3} M_{Mpj-2}}{C_{pi}C_2 + C_{pi}C_{Mpi-2}C_{pi}C_2} |V_1||V_2| \quad (1)$$

where k denotes the number of transmitter coils and j denotes the number of aluminum plates.

Finite element analysis can be used to simulate the coupling coefficient of inductive coupler and capacitive coupling of capacitive coupler of certain embodiments including the coupling coefficient of inductive coupler and the capacitive coupling of the capacitive coupler.

Embodiments provide advantageously adapted input and output current and voltage waveforms. In certain embodiments the input voltage can be nearly, essentially, or effectively in phase with the input current which the unity power factor approximately achieved. The output voltage can be nearly, essentially, or effectively in phase with the output current as well.

Input voltage nearly in phase with the input current means almost unity power factor is achieved which ensures efficient power transfer with minimized reactive power which means voltage and current are almost in phase. Unity power factor (or nearly unity power factor) should be realized in a wireless power transfer system to achieve high efficiency. Unity power factor means that the reactive power in the circuit is zero or near to zero.

Embodiments provide an output power of the combined IPT and CPT system which is the summation of the IPT power and CPT power to provide a total power. In certain embodiments, the total output power of the provided system can be nearly, essentially, or effectively constant and the power pulsation or fluctuation of the output power is reduced and limited (e.g., limited to ±6%.) The reduction in power pulsation is achieved due to the operation of the CPT system to offset the zero (or about zero, or near zero) output power of the IPT system when the receiver is between the inductive coils. When the total output power of the system is nearly, essentially, or effectively constant and the power pulsation or fluctuation is reduced and limited (e.g., to ±6%) in certain embodiments, this is cost-efficient as the aluminum plates are used instead of additional coil made up of copper which provides a more economical solution. Embodiments improve the health and lifetime of the battery because additional heat is generated in the battery with every power pulsation, decreasing the lifetime of the battery. Therefore, embodiments are beneficial for the health state and safety of the battery.

Nearly constant power output means power with a fluctuation limited to ±6% is generated as a vehicle passes over an alternating series of IPT couplers and CPT couplers along a ground path. For example, the $P_{TOTAL}$ curve in FIG. 6 (the summation of $P_{IPT}$ and $P_{CPT}$) varies between about 318 W and about 282 W, around a nominal value of about 300 W which results in a ±6% fluctuation.

Effectively constant power output means a power transfer over time that is within ±6% total variance in power transferred as a vehicle passes over an alternating series of IPT couplers and CPT couplers along a ground path.

Essentially constant power output means a power transfer over time that is within ±6% total variance in power transferred as a vehicle passes over an alternating series of IPT couplers and CPT couplers along a ground path.

Figure 6:
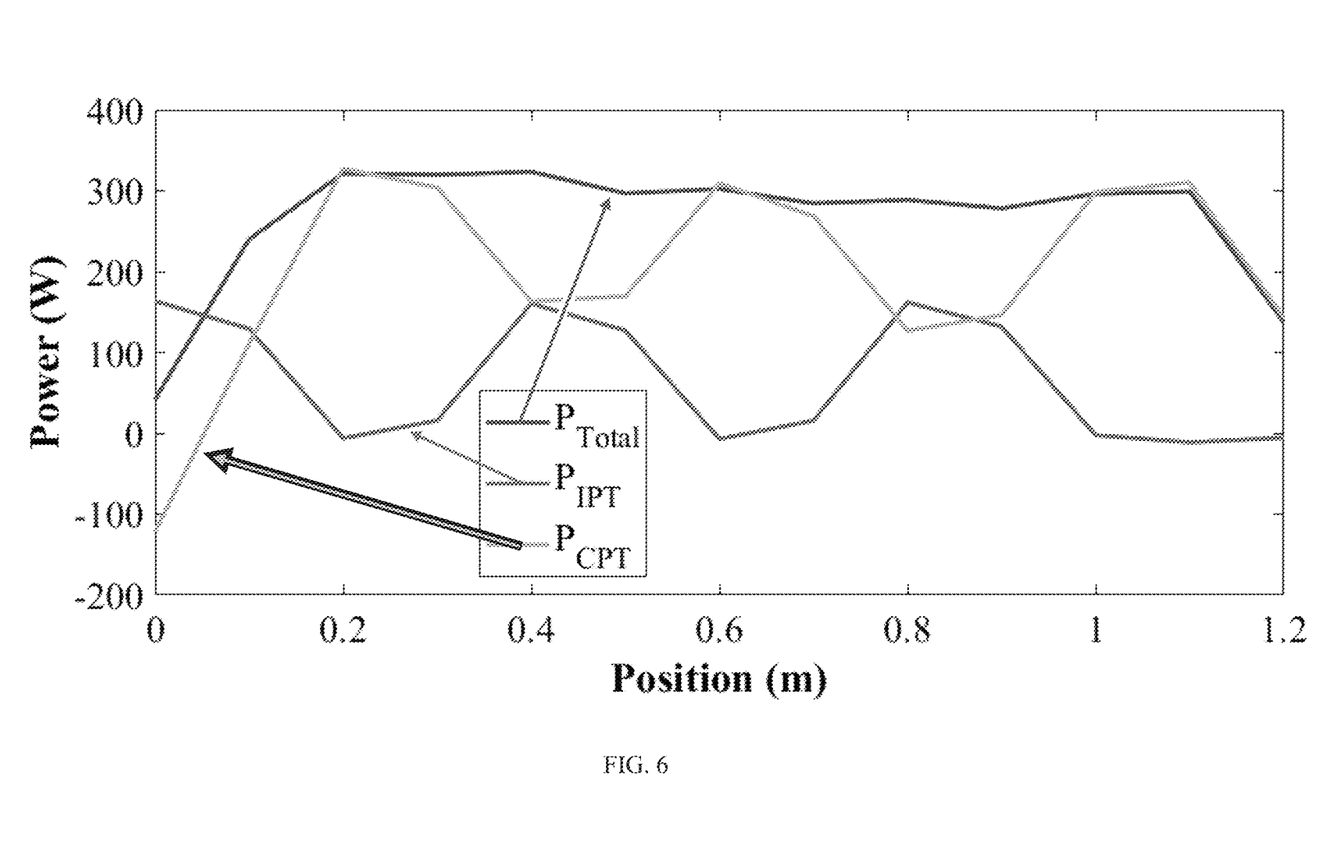
FIG. 6 shows the output power of the proposed combined IPT and CPT system according to an embodiment of the subject invention, which includes the IPT power ($P_{IPT}$, lower, orange line), CPT power ($P_{CPT}$, middle, yellow curve) and the total power ($P_{total}$, upper, blue curve.)

Total output power pulsation is reduced significantly means a variance in power transfer (e.g., the total variance in $P_{TOTAL}=P_{IPT}+P_{CPT}$) over time is limited to ±6% while the output power pulsation for the single IPT system is 100% because in some points the null power phenomenon is occurred. For example, the curve in FIG. 6 for $P_{IPT}$ varies from about 0 W to about 150 W; while the curve in FIG. 6 shows $P_{TOTAL}$ (the summation of $P_{IPT}$ and $P_{CPT}$) varies between about 318 and about 282 W, resulting in a total fluctuation of ±6%.

One important factor that should be consider when a CPT system is used, is human safety. The voltage on the plates is in the kV range, which can emit a strong electric field to the environment around the plate. According to the IEEE C95.1 standard, the electric field strength should be below 614 V/m for human safety. Embodiments provide an electric field emission strength in the driver and/or passenger region(s) above the electric vehicle chassis less than the critical value (614V/m) which is safe for humans in the electric vehicle.

Embodiments provide a novel combined inductive and capacitive power transfer to reduce power pulsation in dynamic charging. Embodiments advantageously use capacitive power transfer to compensate the shortage of power during the period when the receiver is between two inductive coils. As the CPT system contributes in generating power when the IPT system drops while the receiver is between two supply coils, the overall output power with reduced fluctuation can be generated.

In an embodiment, a combined inductive and capacitive system for producing a dynamic wireless power transfer with reduced power pulsation for charging of an electric vehicle in motion along a ground path can comprise: an IPT system comprising a multiplicity of transmitter coils spaced along the ground path; a CPT system comprising a multiplicity of capacitive couplers, alternating between respective transmitter coils along the ground path; an LCC (inductor/capacitor/capacitor) compensation network connected to the IPT system (e.g., the transmitter coils); an LCLC (inductor/capacitor/inductor/capacitor) compensation network connected to the CPT system (e.g., the capacitive couplers); and an inverter configured and adapted to produce a square wave input voltage, $V_{IN}$, to supply the LCC compensation network and drive the IPT system, and to supply the LCLC compensation network and drive the CPT system. The square wave input voltage, $V_{IN}$, can be produced in phase with a corresponding input current, $I_{IN}$. The dynamic wireless power transfer output can be the summation of the IPT subsystem's power and the CPT subsystem's power. The CPT system transfer power can be at its maximum when the IPT system transfer power is at its minimum, such that the dynamic wireless power transfer is provided with reduced power pulsation. The multiplicity of transmitter coils spaced along the ground path can comprise a multiplicity of coil-pairs each respectively having a common coil length and separated from each other by a common coil separation distance along the ground path. The multiplicity of capacitive couplers can comprise a multiplicity of aluminum plates having a common plate length (e.g., the aluminum plate at the receiver along with the chassis of electric vehicle made of aluminum can form a two plate receiver in the CPT system, and an aluminum transmitter plate arranged between inductive coils, together with the earth ground can form a two plate transmitter in the CPT system), thus forming a four plate CPT system. The common coil separation distance can be greater than the common coil length. The common coil separation distance can be greater than 1.05 times the common coil length (e.g., equal to (or about equal to) or greater than 1.1 times the common coil length). The CPT system can use an earth ground (e.g., the same earth ground that serves as one of the four plates) for transferring power. The capacitive couplers can consist essentially of multiple aluminum plates between each respective coil-pair, and the ground as the primary couplers, plus an aluminum plate attached to the vehicle chassis, which chassis (or a portion thereof) can itself comprise the secondary capacitive coupler.

In another embodiment, a combined inductive and capacitive receiver system for receiving a dynamic wireless power transfer with reduced power pulsation for charging of an electric vehicle in motion along a ground path can comprise: a first aluminum body of the electric vehicle; an inductive receiver coil mounted on the electric vehicle, and configured and adapted to produce a first alternating current (AC) voltage in the presence of an inductive transmitter; a second aluminum body shielding a portion of the electric vehicle from the inductive receiver coil, the first aluminum body and the second aluminum body together configured and adapted to produce a second AC voltage in the presence of a capacitive transmitter; and (at the receiver side) a compensation network connected with a rectifier, which can be used to convert the a total AC voltage (e.g., combined first AC voltage and second AC voltage) to a direct current (DC) voltage to supply an electric vehicle battery in the electric vehicle in motion along the ground path. The compensation network can comprise: an LCC compensation network connected to the inductive receiver coil; and an LCLC compensation network connected to (the first aluminum body and the second aluminum body or) aluminum installed under the vehicle's chassis and the chassis itself, which can be made of aluminum. The rectifier can be configured and/or adapted to produce a square wave output voltage (e.g., AC square wave output voltage), $V_{OUT}$, in phase with a corresponding output current, $I_{OUT}$, in response to the first AC voltage and the second AC voltage.

In another embodiment, a combined inductive and capacitive system for delivering a dynamic wireless power transfer with reduced power pulsation to an electric vehicle in motion along a ground path can comprise: any or all of the features described above in the paragraph before the previous paragraph. The system can further comprise a combined inductive and capacitive receiver system for receiving the dynamic wireless power transfer with reduced power pulsation within the electric vehicle in motion along the ground path. The combined inductive and capacitive receiver system can comprise any or all of the features described in the previous paragraph.

DETAILED DESCRIPTION

In the dynamic charging of electric vehicles, there are long track transmitter coils and segmented coil arrays. Long track transmitter coils, due to lower efficiency and high electromagnetic interference (EMI), are not widely used. Segmented coil arrays are considered an advantageous solution for dynamic charging, reducing the drawbacks of long track transmitter implementations. However, segmented coil array designs have a major drawback with respect to power pulsation. As the receiver moves along the transmitter in a segmented coil array, as the receiver coil is coupled to a series of multiple transmitter coils, as a result of coupling variation, power pulsation and/or fluctuation is created at the receiver side, which can be harmful for the battery lifetime and can also adversely affect the efficiency.

Embodiments of the subject invention provide novel and advantageous combined IPT and CPT systems and methods that can reduce the power pulsation observed in related art systems. In certain embodiments, aluminum plates are placed between the transmitter coils, so when the receiver is between the coils, its power will not drop because the CPT system will be enabled and contribute to the output power. By using this system, the power pulsation or fluctuation will be reduced and limited to ±6% due to operation of CPT system to offset specific periods of reduced, effectively zero, near zero, or zero output power of the IPT system that can occur when the receiver is between the IPT coils. As the aluminum plates cover the space between coils, the IPT coils can be separated from each other by a longer distance compared to conventional segmented coils; therefore, a lesser amount of copper can be used which improves the cost effectiveness of the provided system.

In certain embodiments, IPT and CPT systems are provided in an alternating sequence and arranged so that the overall charging system output power will be more constant. Both the IPT system and the CPT systems can operate simultaneously and contribute to generating a more consistent overall output power.

Embodiments provide an output power of the combined IPT and CPT system which is the summation of the IPT power and CPT power to provide a total power (e.g., as shown in FIG. 6.) In certain embodiments, the total output power of the provided system can be nearly, essentially, or effectively constant and the power pulsation or fluctuation of the output power is reduced and limited to ±6%.

The fluctuation of the output power can be measured over time or position as the vehicle moves along the ground path. For example, a fluctuation of the output power can be measured across one cycle of the IPT power transfer measured from a first peak (e.g., a local maximum, or alternatively, a local minimum) value of PST to a second peak (e.g., a local maximum, or alternatively, a local minimum) value of $P_{IPT}$ as the vehicle travels at a constant velocity and/or speed along the ground path. Referring to FIG. 6 to illustrate an exemplary and non-limiting embodiment, the total power transfer ($P_{TOTAL}$) can be measured from a first peak value of PST at about 0.6 m to a second peak value of PST at about 1.0 m.

Alternatively, a fluctuation of the output power can be measured across one cycle of the CPT power transfer measured from a first peak (e.g., a local maximum, or alternatively, a local minimum) value of $P_{CPT}$ to a second peak (e.g., a local maximum, or alternatively, a local minimum) value of $P_{CPT}$ as the vehicle travels at a constant velocity and/or speed along the ground path. Referring to FIG. 6 to illustrate an exemplary and non-limiting embodiment, the total power transfer ($P_{TOTAL}$) can be measured from a first peak value of $P_{IPT}$ at about 0.4 m to a second peak value of $P_{IPT}$ at about 0.8 m.

Alternatively, a fluctuation of the output power can be measured across multiple contiguous cycles of either the IPT power transfer or the CPT power transfer. Alternatively, a fluctuation of the output power can be measured across multiple discontinuous cycles of either the IPT power transfer or the CPT power transfer. Alternatively, a fluctuation of the output power can be measured across a range not related to the timing of cycles of either the IPT power transfer or the CPT power transfer. For example, a fluctuation of the output power can be measured across a specified time or distance of travel and/or at a constant, variable, or changing velocity and/or speed of the vehicle along the ground path. Alternatively, a fluctuation of the output power can be measured as an absolute minimum or maximum value over a measurement interval with or without excluding transitional effects.

In certain embodiments, a beginning or ending segment can produce transitional effects that can be excluded from the measurement of output power. Turning again to FIG. 6 to illustrate an exemplary and non-limiting example, the value of $P_{CPT}$ (and also the resulting value of $P_{TOTAL}$) exhibits a transitional effect as position moves from 0 m to 0.2 m. Conversely, the value of PST (and also the resulting value of $P_{TOTAL}$) exhibits a transitional effect as position moves from 1.0 m to 1.2 m along the ground path.

As known in related art CPT systems, four plates are used to transfer power, of which two plates (e.g., a first transmitter plate and a second transmitter plate) are in the transmitter side and two plates (e.g., a first receiver plate and a second receiver plate) are at the receiver side. At the transmitter side, embodiments add a multiplicity of first transmitter plates between the coils while earth ground can be used to provide the function and/or performance of a multiplicity of second transmitter plates for transferring power, thus advantageously providing an economical and efficient solution for the two required plates for forming an effective CPT system at the transmitter side. In certain embodiments the electric vehicle chassis is made of aluminum and the receiver coil is provided with one aluminum plate as shielding; therefore, without adding any plate at the receiver side, embodiments have two required aluminum plates at the receiver side for forming the CPT system. As described above, for providing a CPT system between coils embodiments add one plate between each transmitter coil and advantageously utilize a common earth ground as a second transmitter plate, which makes the provided system more cost effective than related art alternatives.

Embodiments provide a combined inductive and capacitive system for producing a dynamic wireless power transfer with reduced power pulsation for charging of an electric vehicle in motion along a ground path. The ground path can be along, above, below, or embedded within a road, highway, tunnel, bridge, or other structure where electric vehicles can travel. In certain embodiments the system advantageously uses a natural earth ground present in or connected to the ground path as the electrical ground for the charging system. The ground path can provide the second plate for capacitive couplers on the transmitter side.

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1—System Design and Advantages According to an Embodiment of the Subject Invention One exemplary and non-limiting embodiment provides an inverter at the input side for producing square wave voltage to supply the compensation network. The compensation network for the IPT system in this embodiment is a LCC compensation network configured and adapted to reduce, inhibit, and/or minimize the reactive power (e.g., reducing a measurement of volt amperes reactive) of the system and to connect to the transmitter coils on the ground.

The compensation network for the CPT system in this embodiment is a LCLC compensation network which is connected to the transmitter plates on the ground. The transmitter couplers contain both inductive and capacitive couplers. The IPT couplers can comprise multiple coils separated from each other by a specific distance. The capacitive couplers can comprise aluminum plates that are placed between the inductive coils to reduce power pulsation. The receiver side contains an inductive coil and aluminum plate that can transfer power during CPT system operation. The receiver coupler is connected with a compensation network and the compensation network is connected with a rectifier to convert ac voltage to dc voltage to supply the electric vehicle battery.

Advantages related to cost effectiveness are provided in this embodiment of the subject invention. As related art systems require additional coils added to the main coil of an IPT system to reduce power pulsation, the provided embodiment uses aluminum, which can be four times more economical than copper, and provides an advantage in the provided system with regard to cost and availability.

Advantages related to reduced or lower power pulsation are provided in this embodiment of the subject invention. Related art dynamic charging systems are either IPT or CPT system. Often, IPT is used due to higher efficiency but in the segmented coil array has the major concern of power pulsation. This embodiment advantageously provides the capability of both IPT and CPT systems to reduce the power pulsation and obtain a smoother power as both IPT and CPT systems are configured, adapted, and balanced to operate alternatively to supply reduced-pulsation power.

Advantages related to higher reliability compared to related art controllers are provided in this embodiment of the subject invention. Related art systems and methods focus on a variety of aspects related to controllers to reduce power pulsation, but in the real world as different electric vehicles are being charged at the same time, communication between electric vehicles and a central control center is required which reduces the reliability, increases the cost, and increases the complexity of related art systems and methods. The provided embodiment does not need any such communication, which results in lower cost, reduced complexity, and higher reliability compares to related art controllers used for reducing power pulsation.

FIG. 1 shows the structure of the provided system, according to an embodiment of the subject invention. Three IPT coils are shown on the ground at the transmitter side and aluminum plates are placed between the coils to form the capacitive couplers. The IPT couplers are connected with a LCC compensation network, and CPT couplers connected with a LCLC compensation network fed with an inverter. At the receiver side, both the IPT coil and the aluminum plate can be installed under the chassis of the electric vehicle. It should be noted that the chassis of an electric vehicle is commonly made from aluminum, which optionally and advantageously serve the function of a second plate for forming an efficient and effective two plate capacitive coupler receiver in the CPT system. The receiver coil is connected to the LCC Compensation network and the aluminum plate is connected with a LCLC compensation network which minimizes the reactive power in the circuit and provides zero voltage switching (ZVS.) A rectifier is provided to convert ac current to dc current to supply the battery.

In this Example, the IPT coupler and CPT coupler were designed through Ansys Maxwell Electromechanical Device Analysis Software (ANSYS, Inc., Canonsburg, PA), and after obtaining the dimension of both IPT and CPT coupler, the circuit working principle is analyzed by MATLAB (The MathWorks, Inc., Natick, MA.)

FIG. 2 shows the circuit topology of the provided combined IPT-CPT system, according to an embodiment of the subject invention.

Example 2—System Design and Analysis, According to an Embodiment of the Subject Invention FIG. 1 shows the structure of a provided combined IPT and CPT system, according to an embodiment of the subject invention. Three IPT coils are installed on the ground as the transmitter and aluminum plates are placed between the coils to form the capacitive couplers, optionally and advantageously using the ground to serve the function of a second plate forming an efficient and effective two plate capacitive coupler transmitter. The IPT couplers are connected with a LCC compensation network, and CPT couplers connected with a LCLC compensation network, fed with an inverter. At the receiver side, both the IPT coil and the aluminum plate are installed under the chassis of the electric vehicle. It should be noted that the chassis of electric vehicle is made of aluminum, which is advantageously used as a plate for forming the CPT system. The receiver coil is connected to the LCC compensation network and the aluminum plate is connected with the LCLC compensation network, which minimizes the reactive power in the circuit and provides ZVS. A rectifier is used to convert ac current to dc current to supply the battery.

FIG. 2 shows the circuit topology of the provided combined IPT and CPT system, according to an embodiment of the subject invention. The compensation network of the IPT system is an LCC-compensation network and the compensation network for CPT system is LCLC-compensation network.

The following simulation and analysis of the inductive and capacitive coupler shows that the inductive and capacitive coupling between adjacent coils and plates is very small and thus can be neglected.

Fundamental harmonic approximation is used to calculate the output power of the provided system, according to an embodiment of the subject invention.

The output power of the provided system is shown in Equation (2).

$$P_{out} = P_{IPT} + P_{CPT} = \frac{\sum_{k=1}^{3} M_{pk,2}}{\omega L_{fpi} L_{f2}} |V_1||V_2| + \frac{\omega \sum_{j=1}^{3} M_{Mpj-2}}{C_{pi}C_2 + C_{pi}C_{Mpi-2}C_{pi}C_2} |V_1||V_2| \quad (2)$$

where k denotes the number of transmitter coils and j denotes the number of aluminum plates.

Figure 3:
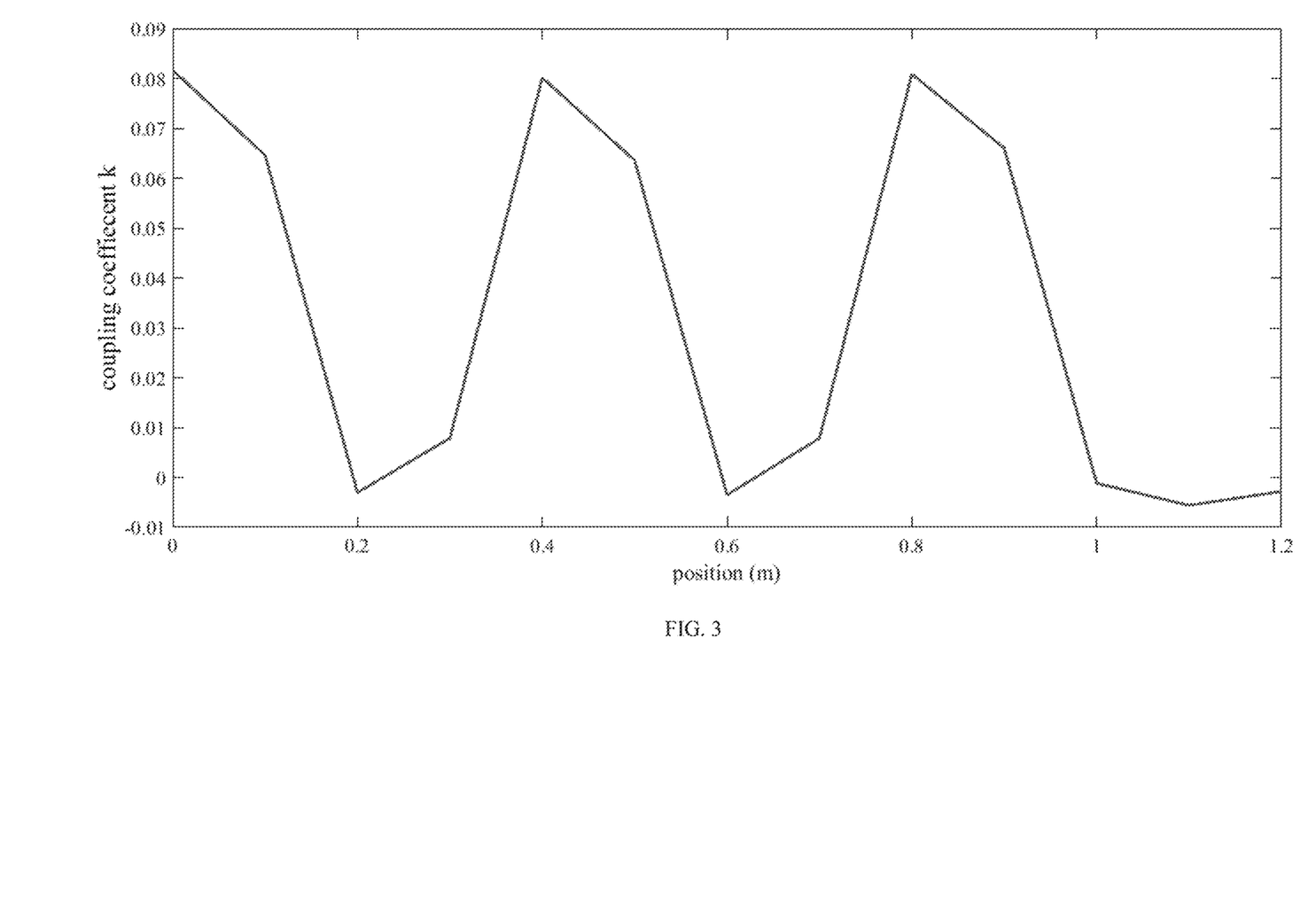
FIG. 3 shows the coupling coefficient of the inductive coupler according to an embodiment of the subject invention.
Figure 4:
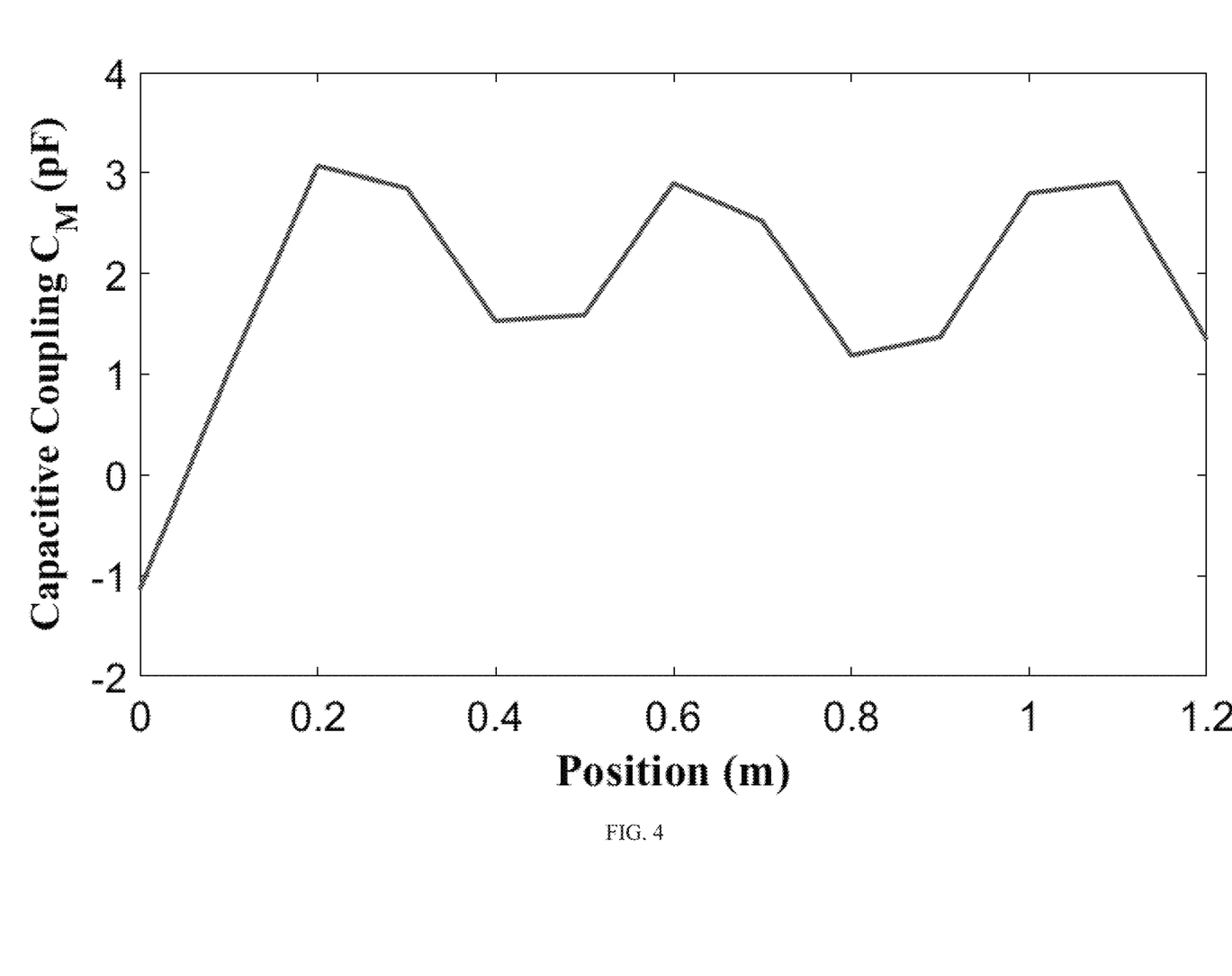
FIG. 4 shows the capacitive coupling of the capacitive coupler according to an embodiment of the subject invention.
Figure 8A:
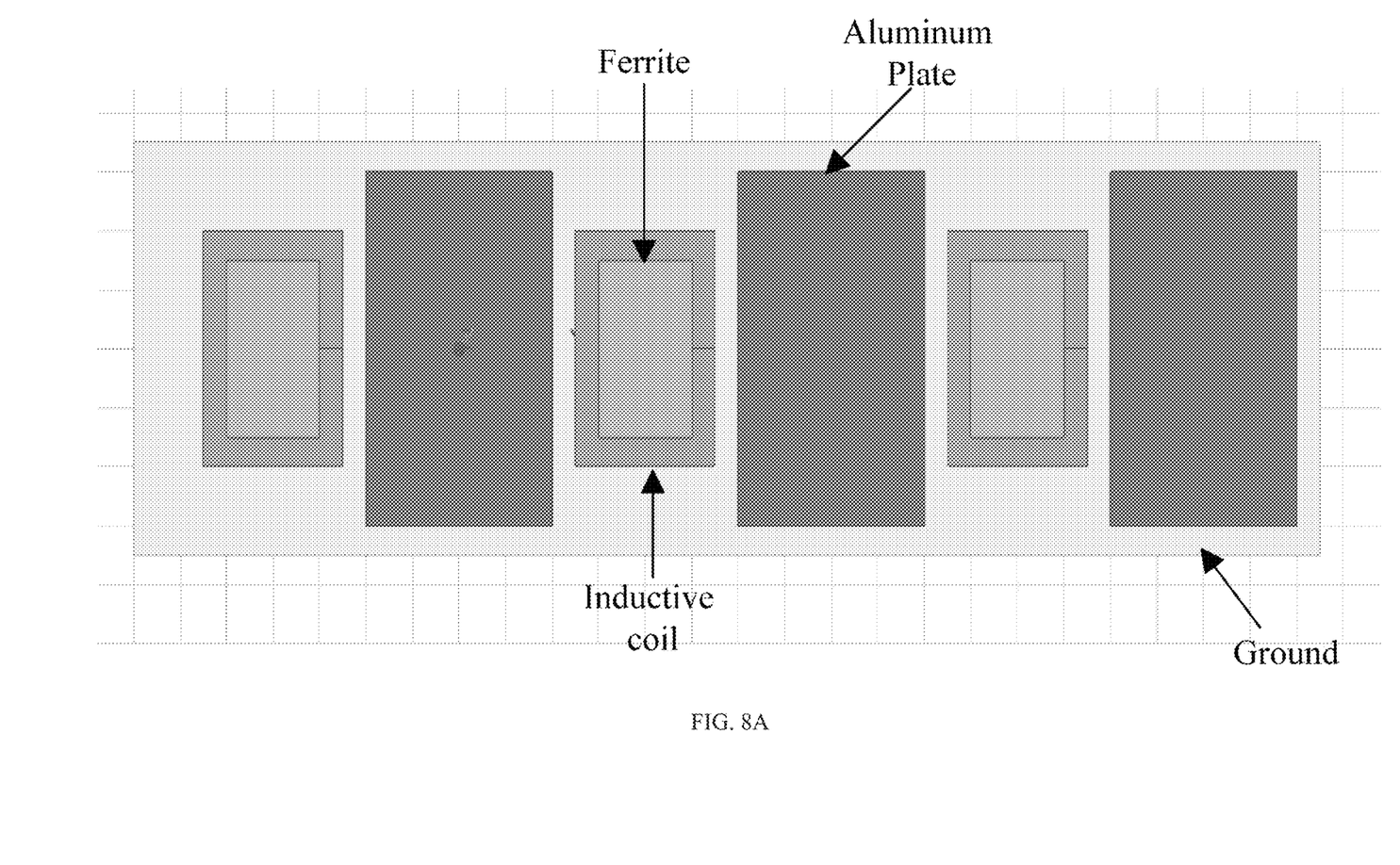
FIG. 8A-8C shows the structure of the transmitter (8A), receiver (8B), and a front view of the overall system (8C), according to an embodiment of the subject invention.
Figure 8B:
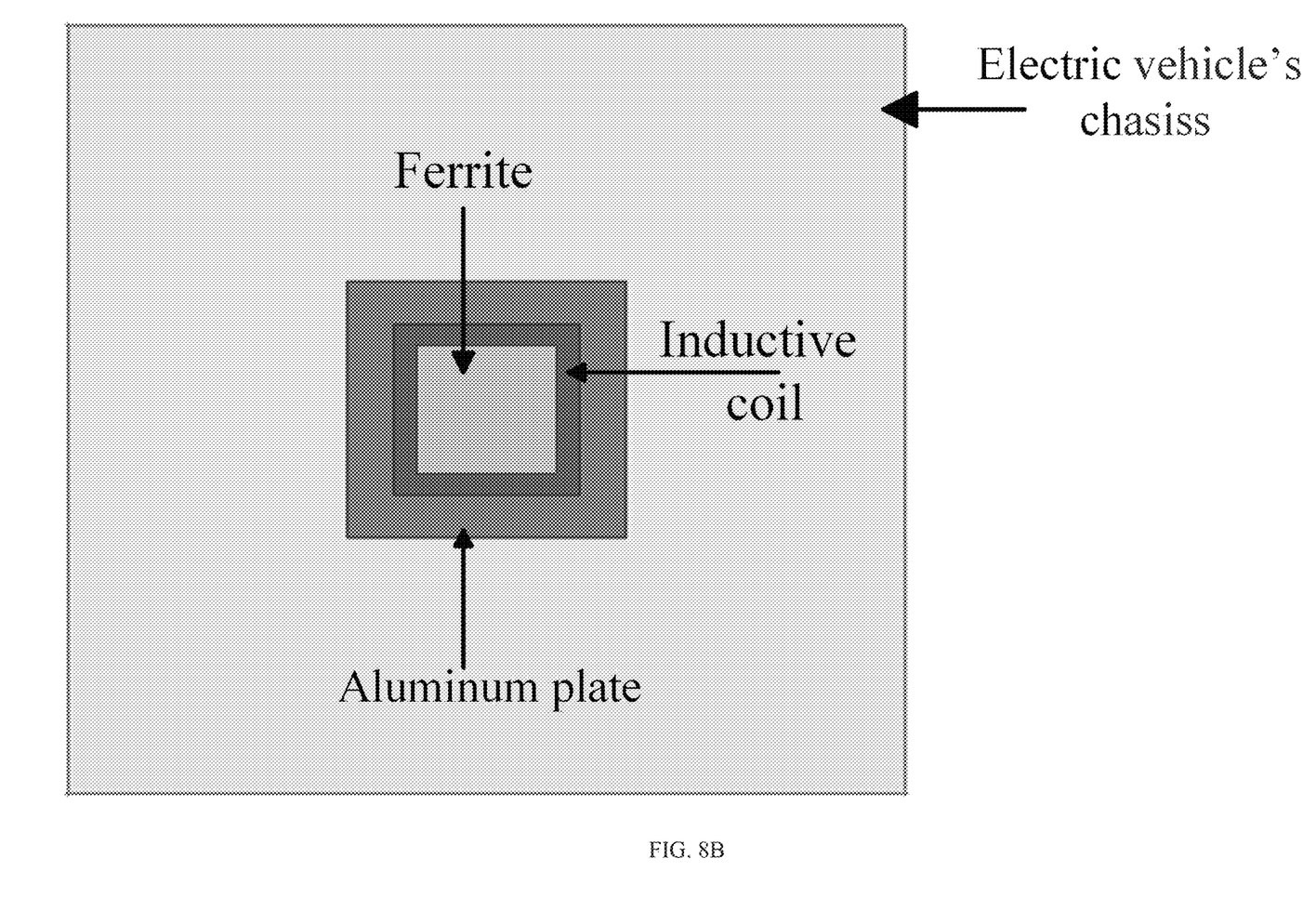
Figure 8C:
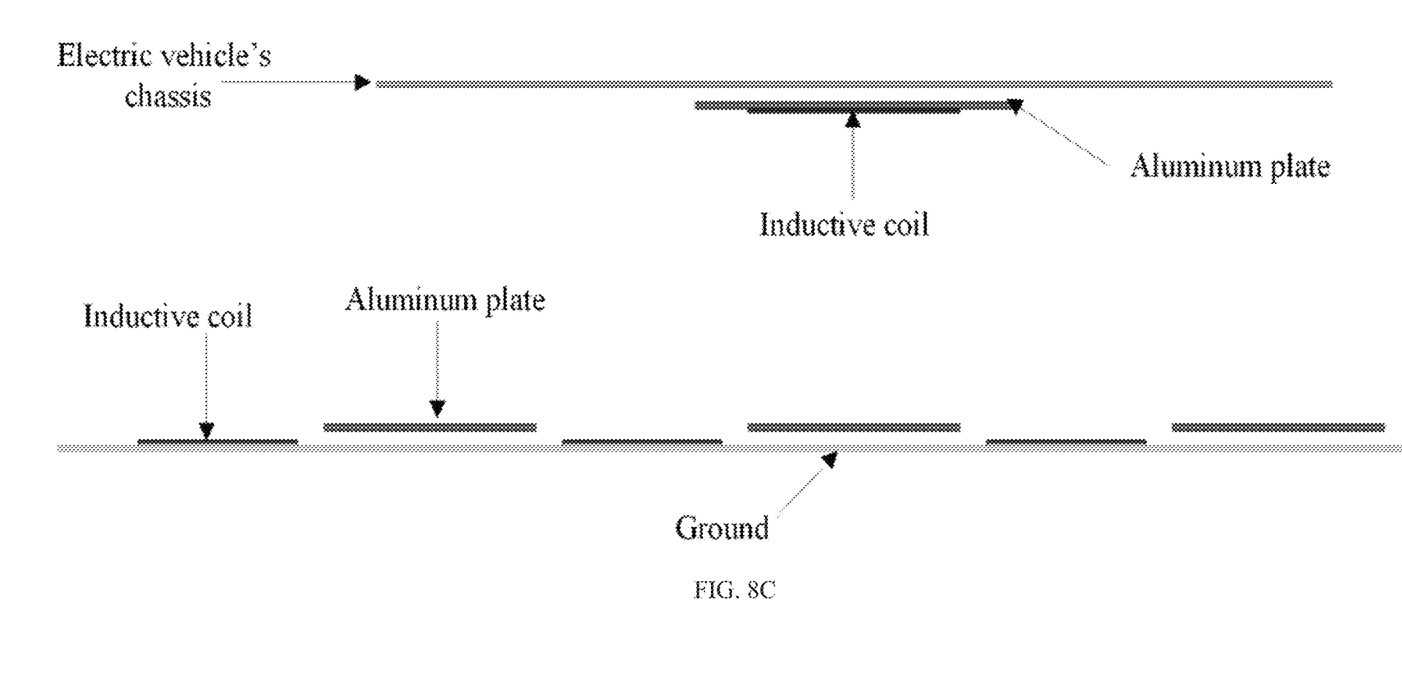

FIGS. 8A-8C show the structure of the inductive and capacitive coupler of the provided embodiment. Finite element analysis is used to simulate the coupling coefficient of inductive coupler and capacitive coupling of capacitive coupler. FIG. 3 shows the coupling coefficient of the inductive coupler and FIG. 4 shows the capacitive coupling of the capacitive coupler.

Figure 5A:
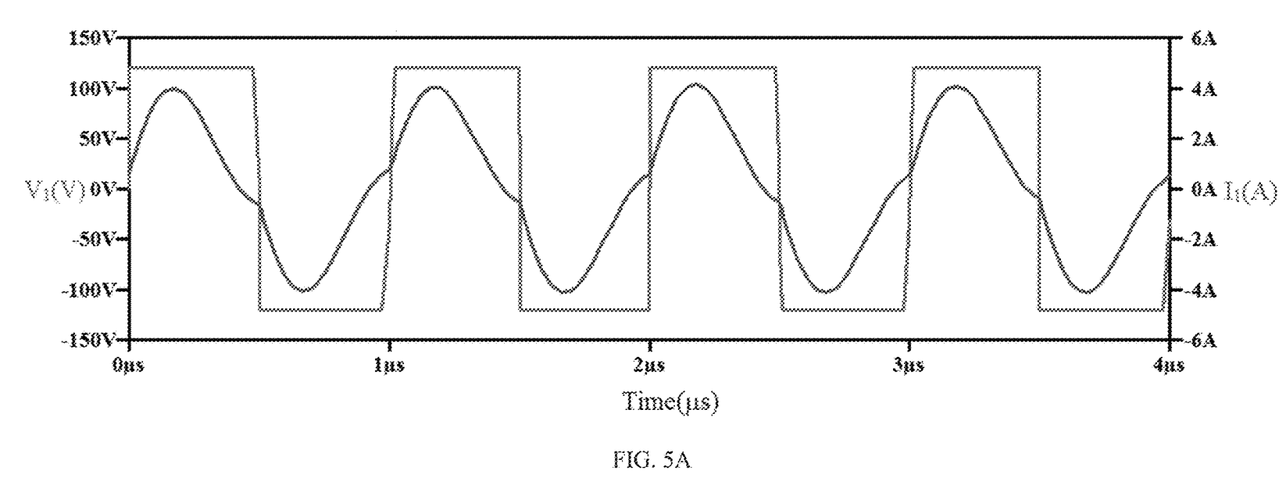
FIG. 5A shows the simulated input current (red curve) and voltage (green square wave) waveforms of the provided system according to an embodiment of the subject invention.
Figure 5B:
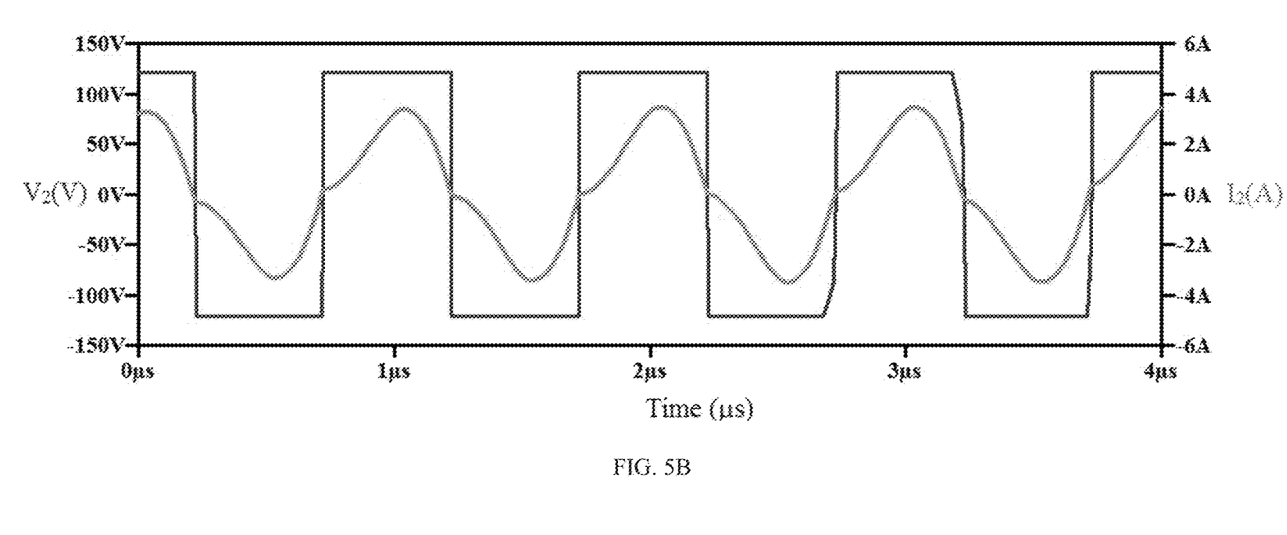
FIG. 5B shows the simulated output current (green curve) and voltage (blue square wave) waveforms of the provided system according to an embodiment of the subject invention. Comparing FIG. 5A to FIG. 5B shows that (i) the input voltage is nearly in phase with the input current such that a unity input power factor is approximately achieved and (ii) the output voltage is nearly in phase with the output current such that a unity output power factor is approximately achieved.

After designing the IPT and CPT coupler, MATLAB software is used to simulate the operation of the proposed circuit. FIGS. 5A-5B show the input and output current and voltage waveform of the proposed system. The input voltage is almost in phase with the input current, such that the unity power factor is approximately achieved. The output voltage is almost in phase with the output current as well, such that the unity power factor is approximately achieved. A value approaching unity power factor is advantageous in wireless power transfer systems and indicates high efficiency. This means that the reactive power (e.g., "wattless" or ineffective power) in the circuit is near to or approaching zero.

The IPT and CPT coupler's dimension alongside with circuit parameters for this embodiment are listed in Table. 1.

TABLE 1

System's specification

| Parameter | Value | Parameter | Value |
|---|---|---|---|
| $V_{in}$ | 120 V | $V_{out}$ | 120 V |
| $f_{sw}$ | 1 MHz | $L_{P1,2,3}$ | 250 µH |
| $l_{pri,plate}$ | 300 mm | $L_{fpi1,2,3}$ | 16.92 µH |
| $w_{pri,plate}$ | 200 mm | $C_{pi1,2,3}$ | 0.107 nF |
| $l_{sec,plate}$ | 300 mm | $C_{fpi1,2,3}$ | 1.5 nF |
| $w_{sec,plate}$ | 300 mm | $C_{i2}$ | 0.110 nF |
| $l_{pri,coil}$ | 200 mm | $C_{fi2}$ | 1.5 nF |
| $l_{w-pri,coil}$ | 25 mm | $L_{fpc1,2,3}$ | 6.15 µH |
| $l_{w-sec,coil}$ | 25 mm | $L_{fc2}$ | 6.15 µH |
| $C_M$ | 3 pF | $C_{fpc1,2,3}$ | 4.12 nF |
| k | 0.08 | $C_{fc2}$ | 4.12 nF |
| $C_{p1,2,3}$ | 120 pF | $C_2$ | 120 pF |
| $L_{pc1,2,3}$ | 212.41 µH | $L_{c2}$ | 211 µH |

FIG. 6 shows the output power of the provided combined IPT and CPT system, which includes the IPT power, CPT power, and the total power. The total output power of the provided embodiment is nearly constant and has a minimal pulsation (e.g., limited to ±6%) because the CPT system contributes to output power to offset the reduced, effectively zero, near zero, or zero output power of the IPT system when the receiver is between the inductive coils. When the electric vehicle is between the coils and the output power of the IPT is at its minimum, the output power of the CPT system is at its maximum value. Thus, the total output power pulsation is reduced significantly, while the overall output power profile remains nearly constant. This system improves the health and lifetime of the battery because the heat generated in the battery from the power pulsation decreases the lifetime of the battery. Therefore, the provided system is beneficial for the health state, longevity, and safety of the battery.

Figure 7:
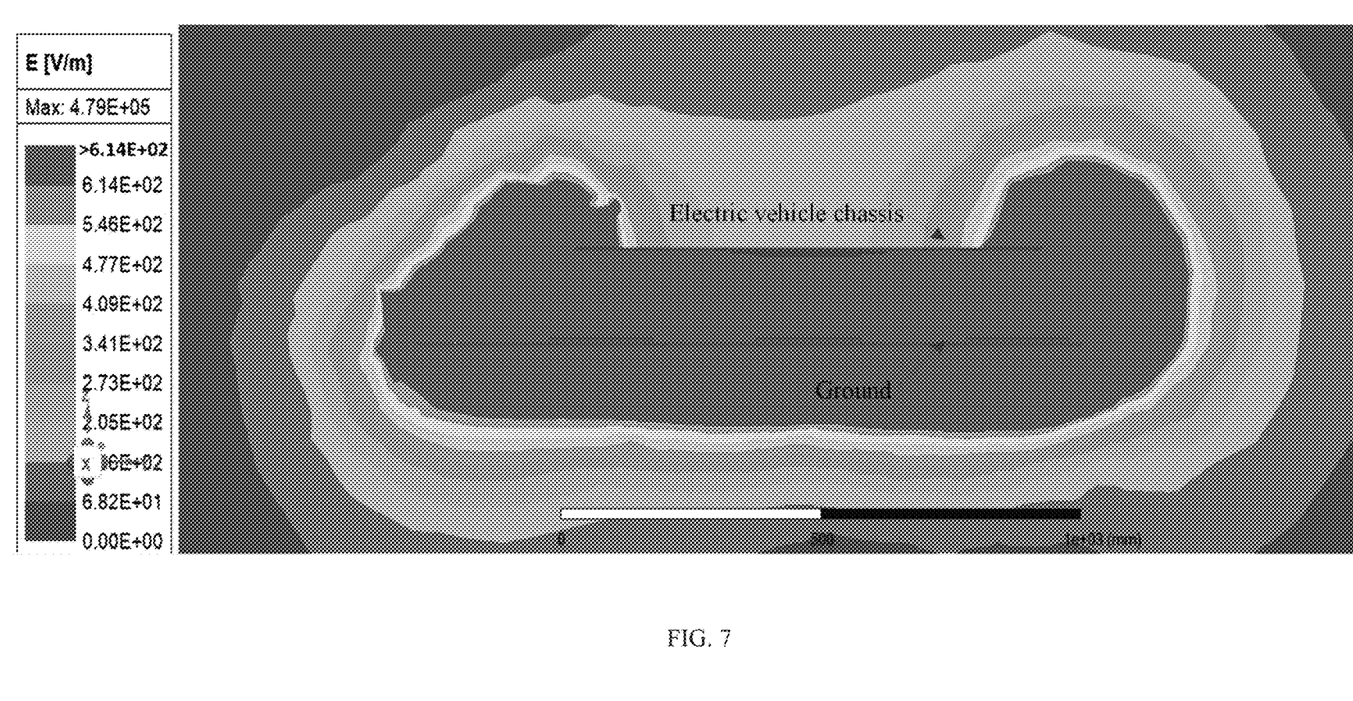
FIG. 7 shows the simulated electric field emission of the provided IPT-CPT charging system according to an embodiment of the subject invention.

Human safety is one of the most important factors when a CPT system is used. The voltage on the plates is in the kV range, which can emit a strong electric field to the environment around the plate. According to IEEE C95.1 standard, the electric field strength should be below 614 V/m for human safety. FIG. 7 shows the electric field emission of the proposed system. The region in red color is above 614 V/m, which is dangerous for human safety.

The electric field strength in the region above the electric vehicle chassis, where the human occupancy is expected, is less than the critical value (614 V/m) and thus is safe for humans in the electric vehicle.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A combined inductive and capacitive system for producing a dynamic wireless power transfer with reduced fluctuation of an output power for charging of an electric vehicle in motion along a ground path, the system comprising:
   an inductive power transfer (IPT) system comprising a multiplicity of transmitter coils spaced along the ground path, and at least one receiver coil installed on a chassis of the electric vehicle;
   a capacitive power transfer (CPT) system comprising a multiplicity of capacitive coupler transmitters spaced along the ground path, each respective capacitive coupler transmitter alternatingly positioned between respective transmitter coils, and using a common earth ground along the ground path as the second plate to form a multiplicity of two plate transmitters, and a first receiver plate installed on the chassis of the electric vehicle, the chassis comprising a sufficient mass of aluminum to function as the second plate to form a two plate receiver;
   an LCC compensation network connected to the IPT system;
   an LCC compensation network connected to the CPT system; and
   an inverter configured and adapted to produce a square wave input voltage, $V_{IN}$, to supply the LCC compensation network and drive the IPT system, and to supply the LCLC compensation network and drive the CPT system,
   the dynamic wireless power transfer comprising the summation of an IPT system power transfer and a CPT system power transfer, and
   the CPT system power transfer configured and adapted to be at its maximum when the IPT system power transfer is at its minimum, such that the fluctuation of the output power is within ±6%.

2. The system according to claim 1, the square wave input voltage, $V_{IN}$, being produced in phase with a corresponding input current, $I_{IN}$.

3. The system according claim 1, the multiplicity of transmitter coils spaced along the ground path comprising a multiplicity of coil-pairs each respectively having a common coil length and separated from each other by a common coil separation distance along the ground path.

4. The system according to claim 3, the multiplicity of capacitive couplers comprising a multiplicity of aluminum plates having a common plate length.

5. The system according to claim 4, the common coil separation distance being equal to or greater than 1.1 times the common coil length.

6. The system according to claim 5, the common plate length being equal to or greater than 1.5 times the common coil separation distance.

7. The system according to claim 3, the common coil separation distance being equal to or greater than 1.1 times the common coil length.

8. The system according to claim 7, the common coil separation distance being equal to or greater than 1.5 times the common coil length.

9. The system according to claim 7, the common coil separation distance being equal to 1.1 times the common coil length.

10. The system according to claim 6, the CPT system configured and adapted to use the common earth ground along the ground path for transferring power.

11. The system according to claim 10, the multiplicity of capacitive coupler transmitters spaced along the ground path consisting essentially of a single respective aluminum plate between each respective coil-pair, plus the common earth ground to form a multiplicity of two plate transmitters; and
   the fluctuation of the output power within ±6% being measured across one or more cycles of the total power transfer ($P_{TOTAL}$) measured from a first peak value of $P_{TOTAL}$ to a second peak value of $P_{TOTAL}$ as the vehicle travels at a constant speed along the ground path.

12. A combined inductive and capacitive receiver system for receiving a dynamic wireless power transfer with reduced power fluctuation for charging of an electric vehicle in motion along a ground path, the receiver system comprising:
   an aluminum body of the electric vehicle;
   an inductive receiver coil mounted on the electric vehicle, and configured and adapted to produce a first alternating current (AC) voltage in the presence of an inductive transmitter;
   an aluminum plate configured and adapted to shield a portion of the electric vehicle from the inductive receiver coil;
   the aluminum body and the aluminum plate together configured and adapted to produce a second AC voltage in the presence of a capacitive transmitter; and
   a compensation network connected with a rectifier to convert the first AC voltage and the second AC voltage to a combined direct current (DC) voltage to supply an electric vehicle battery in the electric vehicle in motion along the ground path.

13. The receiver system according to claim 12, the compensation network comprising:
   an LCC compensation network connected to the inductive receiver coil; and
   an LCLC compensation network connected to the aluminum body and the aluminum plate.

14. The receiver system according to claim 13, the rectifier being configured and adapted to produce a square wave output voltage, $V_{OUT}$, in phase with a corresponding output current, $I_{OUT}$, in response to the first AC voltage and the second AC voltage.

15. A combined inductive and capacitive system for delivering a dynamic wireless power transfer with reduced fluctuation of an output power to an electric vehicle in motion along a ground path, the system comprising:
   an inductive power transfer (IPT) system comprising a multiplicity of transmitter coils spaced along the ground path;
   a capacitive power transfer (CPT) system comprising a multiplicity of capacitive couplers, alternating between respective transmitter coils along the ground path; and
   an LCC compensation network connected to the IPT system;
   an LCLC compensation network connected to the CPT system; and
   an inverter configured and adapted to produce a square wave input voltage, $V_{IN}$, to supply the LCC compensation network and drive the IPT system, and to supply the LCLC compensation network and drive the CPT system,
   the square wave input voltage, $V_{IN}$, being produced in phase with a corresponding input current, $I_{IN}$,
   the dynamic wireless power transfer comprising the summation of an IPT system transfer power and a CPT system transfer power, the CPT system transfer power being at its maximum when the IPT system transfer power is at its minimum, such that the dynamic wireless power transfer is provided with fluctuation of the output power within ±6%, the multiplicity of transmitter coils spaced along the ground path comprising a multiplicity of coil-pairs each respectively having a common coil length and separated from each other by a common coil separation distance along the ground path, the multiplicity of capacitive couplers comprising a multiplicity of aluminum plates having a common plate length, the common coil separation distance being equal to or greater than 1.1 times the common coil length, and the common coil separation distance being about equal to or greater than 0.73 times the common plate length.

16. The system according to claim 15, the common coil separation distance being equal to 1.1 times the common coil length, the CPT system using a common earth ground along the ground path for transferring power, and the multiplicity of capacitive couplers consisting essentially of a multiplicity of respective aluminum plates between each respective coil-pair, plus an aluminum plate along the ground path at the transmitter side.

17. The system according to claim 16, further comprising a combined inductive and capacitive receiver system for receiving the dynamic wireless power transfer with reduced fluctuation of the output power within the electric vehicle in motion along the ground path, the combined inductive and capacitive receiver system comprising:

an aluminum body of the electric vehicle;

an inductive receiver coil mounted on the electric vehicle, and configured and adapted to produce a first alternating current (AC) voltage in the presence of an inductive transmitter;

an aluminum plate configured and adapted to shield a portion of the electric vehicle from the inductive receiver coil, the aluminum body and the aluminum plate together configured and adapted to produce a second AC voltage in the presence of a capacitive transmitter; and a compensation network connected with a rectifier to convert the first AC voltage and the second AC voltage to a combined dc voltage to supply an electric vehicle battery in the electric vehicle in motion along the ground path.

18. The system according to claim 17, the compensation network comprising:

an LCC compensation network connected to the inductive receiver coil; and an LCLC compensation network connected to the aluminum body and the aluminum plate, the rectifier configured and adapted to produce a square wave output voltage, $V_{OUT}$, in phase with a corresponding output current, $I_{OUT}$, in response to the first AC voltage and the second AC voltage, and the fluctuation of the output power within ±6% being measured across one cycle of the total power transfer ($P_{TOTAL}$) measured from a first peak value of $P_{TOTAL}$ to a second peak value of $P_{TOTAL}$ as the vehicle travels at a constant speed along the ground path.

* * * * *